(12) United States Patent
Witt (10) Patent No.: US 8,510,269 B2
(45) Date of Patent: Aug. 13, 2013

(54) UNINTERRUPTED DATABASE INDEX REORGANIZATION/MOVEMENT

(75) Inventor: Russell Witt, Plano, TX (US)

(73) Assignee: CA, Inc., Islandia, NY (US)

( * ) Notice: Subject to any disclaimer, the term of this patent is extended or adjusted under 35 U.S.C. 154(b) by 1465 days.

(21) Appl. No.: 11/134,097

(22) Filed: May 20, 2005

(65) Prior Publication Data

US 2005/0262118 A1    Nov. 24, 2005

Related U.S. Application Data (60) Provisional application No. 60/573,670, filed on May 21, 2004.

(51) Int. Cl.
*G06F 7/00* (2006.01)
*G06F 17/00* (2006.01)

(52) U.S. Cl.
USPC ......................................................... 707/635

(58) Field of Classification Search
USPC ......................................................... 707/635
See application file for complete search history.

(56) References Cited

U.S. PATENT DOCUMENTS

| | | | | |
|---|---|---|---|---|
| 5,408,654 A | * | 4/1995 | Barry ............................ | 707/752 |
| 5,594,900 A | * | 1/1997 | Cohn et al. ............................ | 1/1 |
| 5,794,242 A | | 8/1998 | Green et al. .................... | 707/10 |
| 6,182,079 B1 | * | 1/2001 | Lenzie ................................. | 1/1 |
| 6,199,069 B1 | * | 3/2001 | Dettinger et al. ..................... | 1/1 |
| 6,377,959 B1 | * | 4/2002 | Carlson .................................. | 1/1 |
| 2002/0010701 A1 | | 1/2002 | Kosciuszko et al. .......... | 707/100 |
| 2002/0107876 A1 | * | 8/2002 | Tsuchida et al. .............. | 707/202 |
| 2002/0133491 A1 | * | 9/2002 | Sim et al. ......................... | 707/10 |
| 2004/0098423 A1 | | 5/2004 | Chigusa et al. ............... | 707/204 |

OTHER PUBLICATIONS

Notification of Transmittal of the International Search Report for application PCT/US2005/017602 (7 pages), Dec. 27, 2005.
Written Opinion of the International Searching Authority for application PCT/US2005/017602 (5 pages), Dec. 27, 2005.
Communication pursuant to 94(3) EPC, Application No. 05 751 758.3-1527, Ref. No. HCD/J00049298EP, 4 pages, Dec. 17, 2010.

* cited by examiner

*Primary Examiner* — Hosain Alam
*Assistant Examiner* — Van Oberly
(74) *Attorney, Agent, or Firm* — Baker Botts, LLP (57) ABSTRACT

A method for reorganizing a first database includes copying data from the first database to a second database having an index structure different from that of the first database, updating the second database to reflect changes that have been made to the first database since the commencement of the copying, and switching the second database for the first database.

29 Claims, 6 Drawing Sheets

UNINTERRUPTED DATABASE INDEX REORGANIZATION/MOVEMENT

REFERENCE TO RELATED APPLICATION

The present disclosure is based on and claims the benefit of Provisional application Ser. No. 60/573,670 filed May 21, 2004, the entire contents of which are herein incorporated by reference.

BACKGROUND

1. Technical Field

The present disclosure relates to databases and, more specifically, to uninterrupted reorganization and movement of databases.

2. Description of the Related Art

A database is an organized collection of data. Most databases are computerized and are stored on computer-readable storage devices, such as hard disks. Computerized databases are frequently built, maintained and called upon to store, organize, and retrieve useful information as needed. A database management system (DBMS) is generally a computer program that is designed to store, organize, and retrieve computerized database information.

Many databases organize information as a collection of tables. Each table may include one or more entries and each entry may have one or more attributes. Each attribute may then be assigned one or more values. Each table may include one or more columns; a single column generally stores a single attribute for each entry. Each table may include of one or more rows, a single row generally stores a single entry with all of its attributes.

In certain databases, for example relational databases, two or more tables may be related to each other by virtue of sharing common entries and/or common elements. A DBMS for relational databases may utilize various indexes in responding to queries.

Database entries may be hierarchically arranged such that some entries are parents of other entries which are children.

Indexing is a technique used by most current DBMSs to speed up particular kinds of queries. For example, redundant information may be internally generated and stored in the database tables to more quickly locate table entries. The most common kind of index is a sorted list of the contents of some particular table column, with pointers to the row associated with the value.

There are multiple different forms of indexed databases. One such form is a fixed-indexed database. The fixed-index database includes an index for assisting in quickly responding to queries that has been specifically organized for a particular database. While the fixed-indexed database may be able to quickly respond to queries, it may be necessary to re-organize the fixed indexes every time the database is modified. For example, it may be necessary to re-organize fixed indexes as new records are added to the database. Re-organizing an index is the process of updating the index to reflect a modified database, for example to reflect the addition of a new database entry. For example, where a fixed-index is the sorted list described above, re-organization may be the re-sorting of the list after a new entry has been added.

Another form of indexed database is the dynamically indexed database. Dynamically indexed databases may utilize indexes that may be modified without having to re-organize the index every time the database is modified. While the dynamically indexed database may not be as fast as the fixed-indexed database, the dynamically indexed database may require less frequent re-organization.

However, with either form of indexed database, periodic re-organization may be required. Re-organization of database indexes often requires that the database be made temporary unavailable. While re-organization is underway, I/O activity, such as for example queries, reads, and updates may be prevented.

There may be other reasons why a database may be made temporarily unavailable. For example, it may be desirable to move a database from one device to another. For example, a database may be moved from one server to another. Moving a database may require that the database be made temporarily unavailable.

Users of modern DBMS are becoming increasingly less tolerant of DBMS downtime. There is therefore a need to utilize a system and method for re-organizing database tables without impeding database I/O activity.

SUMMARY

A method for reorganizing a first database includes copying data from the first database to a second database having an index structure different from that of the first database, updating the second database to reflect changes that have been made to the first database since the commencement of the copying, and switching the second database for the first database.

A method for reorganizing a first database includes preparing a second database, identifying a most recent transaction from a first database log, copying data from the first database to the second database, updating the second database with transactions performed to the first database since the identified most recent transaction, and switching the second database for the first database.

A method for reorganizing a first database includes preparing a second database, identifying a most recent transaction from a first database log, copying data from the first database to the second database, updating the first database and the second database with transactions performed to the first database since the identified most recent transaction, and switching the second database for the first database.

A method for moving a first database from a first device to a second device includes copying data from the first database on the first device to a second database on the second device, updating second database to reflect changes that have been made to the first database since the commencement of the copying, and switching the second database for the first database.

A system for reorganizing a first database includes a copying unit for copying data from the first database to a second database having an index structure different from that of the first database, an updating unit for updating the second database to reflect changes that have been made to the first database since the commencement of the copying, and a switching unit for switching the second database for the first database.

A system for reorganizing a first database includes a preparing unit for preparing a second database, an identifying unit for identifying a most recent transaction from a first database log, a copying unit for copying data from the first database to the second database, an updating unit for updating the second database with transactions performed to the first database since the identified most recent transaction, and a switching unit for switching the second database for the first database.

A system for moving a first database from a first device to a second device includes a copying unit for copying data from the first database on the first device to a second database on the second device, an updating unit for updating second database to reflect changes that have been made to the first database since the commencement of the copying, and a switching unit for switching the second database for the first database.

A computer system includes a processor and a program storage device readable by the computer system, embodying a program of instructions executable by the processor to perform method steps for reorganizing a first database. The method includes copying data from the first database to a second database having an index structure different from that of the first database, updating the second database to reflect changes that have been made to the first database since the commencement of the copying, and switching the second database for the first database.

A computer system includes a processor and a program storage device readable by the computer system, embodying a program of instructions executable by the processor to perform method steps for reorganizing a first database. The method includes preparing a second database, identifying a most recent transaction from a first database log, copying data from the first database to the second database, updating the second database with transactions performed to the first database since the identified most recent transaction, and switching the second database for the first database.

A computer system includes a processor and a program storage device readable by the computer system, embodying a program of instructions executable by the processor to perform method steps for reorganizing a first database. The method includes preparing a second database, identifying a most recent transaction from a first database log, copying data from the first database to the second database, updating the first database and the second database with transactions performed to the first database since the identified most recent transaction, and switching the second database for the first database.

A computer system includes a processor and a program storage device readable by the computer system, embodying a program of instructions executable by the processor to perform method steps for moving a first database from a first device to a second device, the method includes copying data from the first database on the first device to a second database on the second device, updating second database to reflect changes that have been made to the first database since the commencement of the copying, and switching the second database for the first database.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

Embodiments of the present disclosure allow for the re-organization of database indexes and/or the moving of a database from one device to another without interrupting database functionality for extended periods of time.

Figure 1:
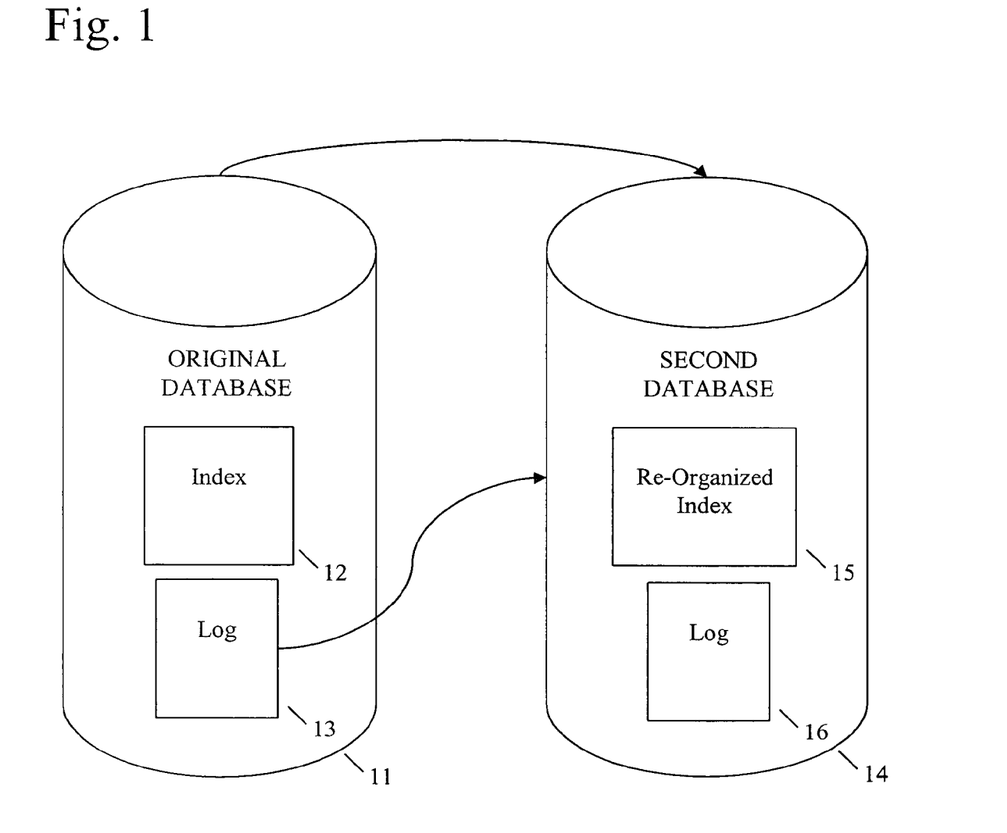
FIG. 1 is a block diagram showing an embodiment of the present disclosure.

FIG. 1 is a block diagram showing an embodiment of the present disclosure. An original database 11 may handle I/O activity such as, for example, query requests and/or database updates. The original database 11 may be an indexed database, for example a fixed-indexed database or a dynamically indexed database, containing one or more indexes 12. The original database 11 may additionally contain a transaction log 13 (also referred to as an audit log). The transaction log 13 may be part of the index itself or a separate file on the same or different data storage device. The transaction log 13 may be a log that records every modification that is made to the original database 11. The transaction log 13 may therefore be used to back out database modifications and/or re-apply database modifications in the event that there is a problem with the integrity of the data stored on the database.

Embodiments of the present disclosure utilize a second database 14 that may be located either on the same data storage device as the original database 11 or on a different data storage device. This second database 14 may be set up to store the data from the first database 11. The second database 14 may contain an index 15 that has been re-organized. The second database 14 may be used to handle I/O activity intended for the first database 11 allowing for access to the database 11 data without significant interruption. The second database 14 may then continue to function as the primary database handling I/O activity and maintaining a second database transaction log 16.

Figure 2:
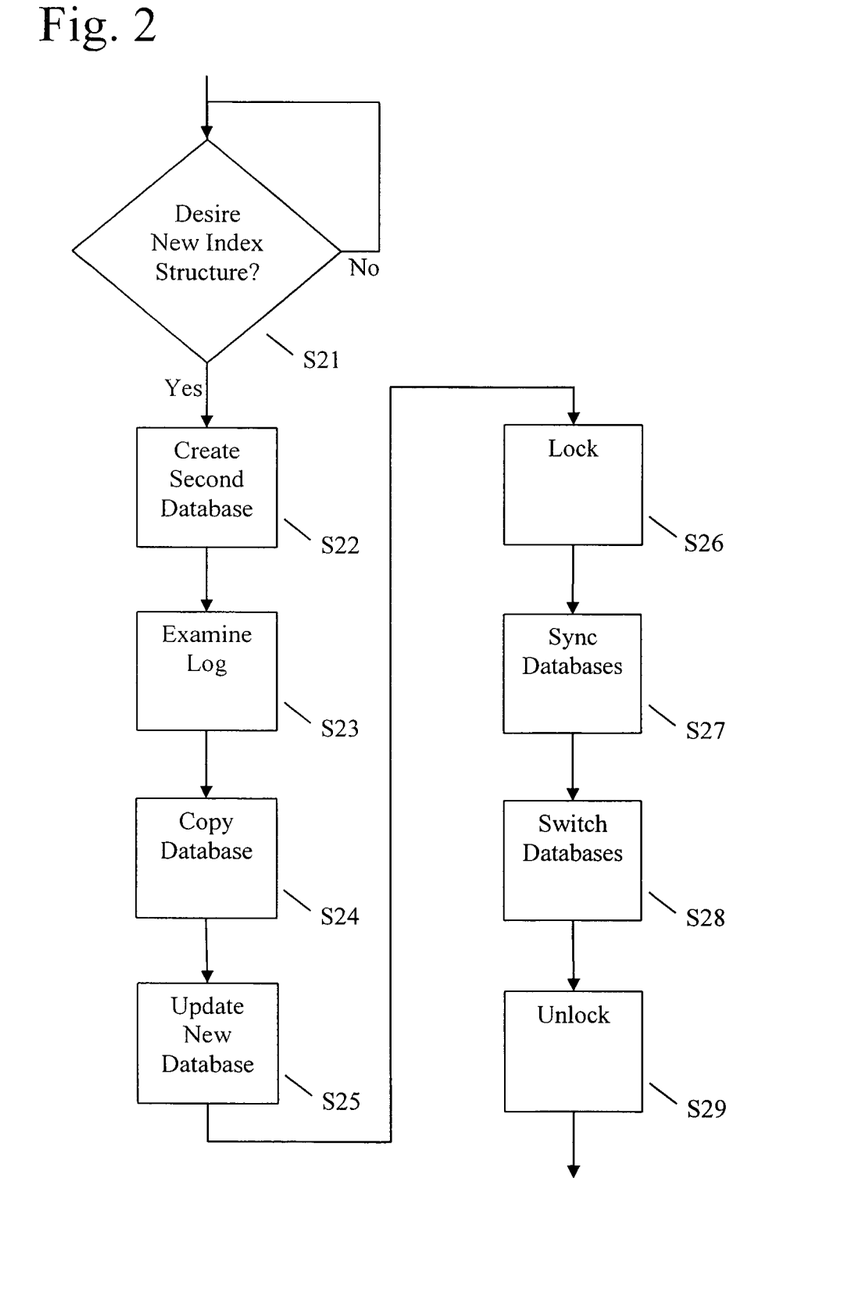
FIG. 2 shows a is a flow chart showing a method for re-organizing a database according to an embodiment of the present disclosure.

FIG. 2 is a flow chart showing a method for re-organizing a database according to an embodiment of the present disclosure. It may first be determined whether a new index structure is desired (Step S21). A new index stricture may be desired, for example, when a database index requires re-organization. Examining the control statements of the DBMS may help determine whether a new index structure is required. If it is determined that a new index structure is not required (No, Step S21) then the determination may be made again (Step S21) at a later point.

If it is determined that a new index structure is required (Yes, Step S21), then a second database may be prepared, for example, the second database may be created or an existing second database may be initialized (Step S22). It may be beneficial to check to see that the appropriate requirements for creating the second database are satisfied before the second database is created. For example, it may be beneficial to check to see that enough free space remains on the device that the second database is to be created on. There should be enough free space to accommodate the existing data in the original database plus the new index structure. Depending on the file-structure of the platform upon which the second database is to be located, the check for free space may not be necessary.

Next, the transaction log of the original database may be examined to determine the identity of the last transaction to be logged to the transaction log (Step S23). Then, the data content of the original database may be copied to the created second database (Step S24). Since the index structure of the new database might be different from the index structure of the old database, a "get" command used to read data from the original database and a "put" command used to write data to the second database may each refer to their own index structure. For example, data taken from a particular address on the original database may not occupy the same address once copied to the second database.

After all data has been copied to the second database (Step S24), all transactions that have occurred on the original database since the copying began may be applied to the second database (Step S25). These transactions may be determined by examining the transaction log of the original database and applying all transactions that occurred after the last transaction as identified in Step S23. Care may be given to ensure that the transactions are applied to the second database in a way that accounts for the new index structure of the second database.

Next an exclusive lock may be placed on the original database to ensure that no further changes may be made to the original database (Step S26). The transaction log may then be reexamined to ensure that the second database is properly synchronized with the original database (Step S27). This may entail applying updates to the second database that were made on the original database while second database was updated in Step S25. This step is likely to be very short and therefore the length of time the database is locked for is minimized.

While the database is locked, the second database may be switched for the original database (Step S28). This may entail updating the I/0 control blocks of the applications that utilize the database, for example the DBMS, so that they point to the second database rather than the original database. The exclusive lock may then be removed allowing 110 activity to be directed to the second database (Step S29).

After the above method has been completed, the original database may be disabled to prevent applications from accessing the original database. This will help to ensure that all applications using the database have successfully been switched to the second database.

This process may be repeated every time a new index structure is desired. For example, the resources of the original database may be used as a subsequent database when it is determined that the index structure of the second database is to be renewed.

Figure 3:
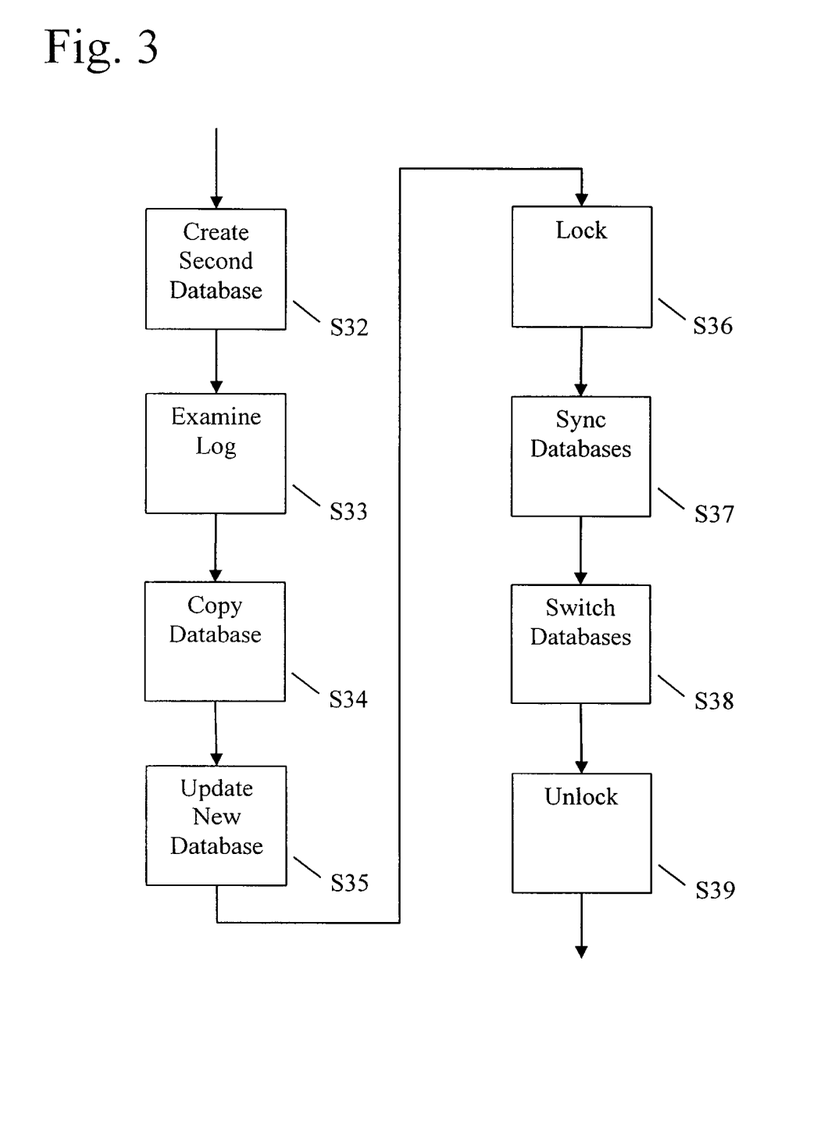
FIG. 3 shows a is a flow chart showing a method for copying a database according to an embodiment of the present disclosure.

FIG. 3 is a flow chart showing a method for copying a database according to an embodiment of the present disclosure. Aspects of this embodiment of the present disclosure closely follow the embodiment described above and shown in FIG. 2. Details described above may therefore be used in carrying out corresponding steps in the current embodiment. First, a second database may be created (Step S32). Next, the transaction log of the original database may be examined to determine the identity of the last transaction to be logged to the transaction log (Step S33). Then the data content of the original database may be copied to the created second database (Step S34). After all data has been copied to the second database (Step S34), all transactions that have occurred on the original database since the copying began may be applied to the second database (Step S35). Next an exclusive lock may be placed on the original database to ensure that no further changes may be made to the original database (Step S36). The transaction log may then be reexamined to ensure that the second database is properly synchronized with the original database (Step S37). While the database is locked, the second database is switched for the original database (Step S38). The exclusive lock may then be removed allowing I/0 activity to be directed to the second database (Step S39).

Figure 4:
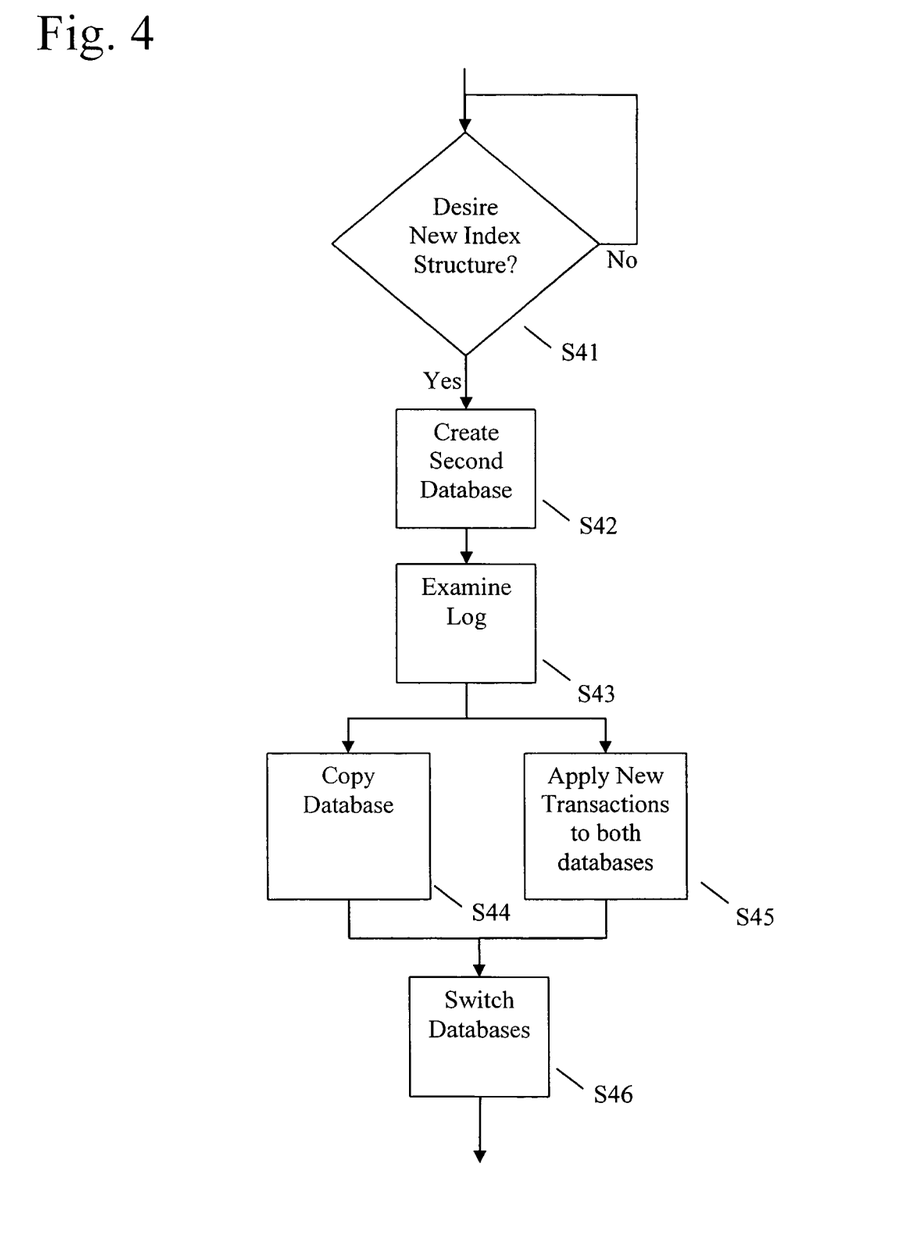
FIG. 4 is a flow chart showing a method for re-organizing a database according to another embodiment of the present disclosure.

FIG. 4 is a flow chart showing a method for re-organizing a database according to another embodiment of the present disclosure. Aspects of this embodiment of the present disclosure closely follow the embodiment described above and shown in FIG. 2. Details described above may therefore be used in carrying out corresponding steps in the current embodiment.

It may first be determined whether a new index structure is desired (Step S41). If it is determined that a new index structure is not required (No, Step S41) then the determination may be made again (Step S41) at a later point. If it is determined that a new index structure is required (Yes, Step S41), then a second database may be created (Step S42). The transaction log of the original database may be examined to determine the identity of the last transaction to be logged to the transaction log (Step S43). Then the data content of the original database may be copied to the created second database (Step S44) while subsequent database transactions are applied to both the original database as well as the second database (Step S45). These steps (S44 and S45) may be carried out simultaneously, for example, using parallel processes. There may be multiple ways to apply the transactions to each database simultaneously. For example, if the transaction relates to data that has already been copied, the transaction may be successfully applied to each database while if the transaction relates to data that has yet to be copied, the transaction may be successfully applied to the original database where it will be later copied to the second database. After all data has been copied to the second database (Step S44), the second database may be switched for the original database (Step S46).

Figure 5:
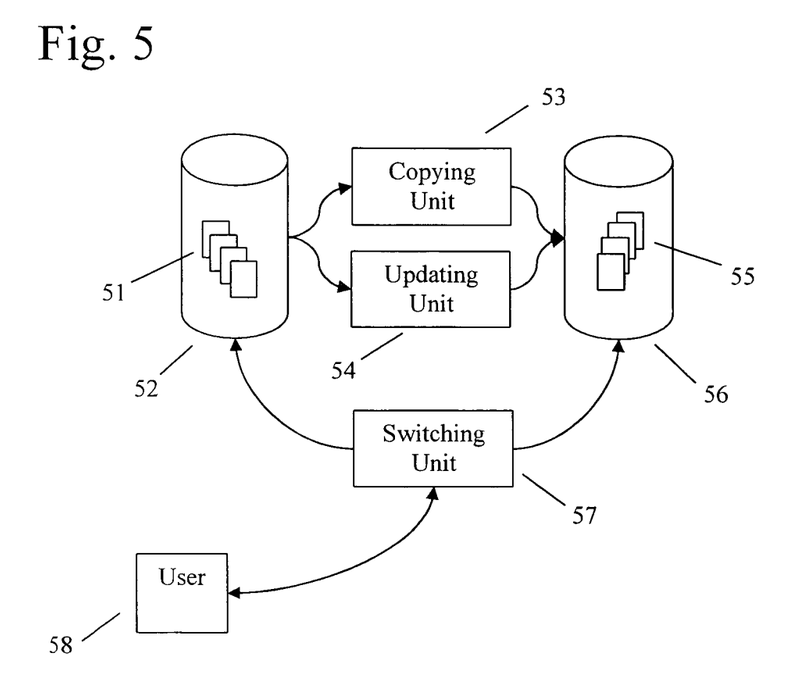
FIG. 5 is a block diagram showing a system according to an embodiment of the present disclosure.

FIG. 5 is a block diagram showing a system according to an embodiment of the present disclosure. A copying unit 53 may copy data from a first database 51 on a first device 52 to a second database 55 on a second device 56. The second database 55 may have a different index structure than the first database 51. An updating unit 54 may then update the second database 55 to reflect changes that may have been made to the fist database 51 since the commencement of the copying. A switching unit 57 may then switch the second database 55 for the first database 51.

Figure 6:
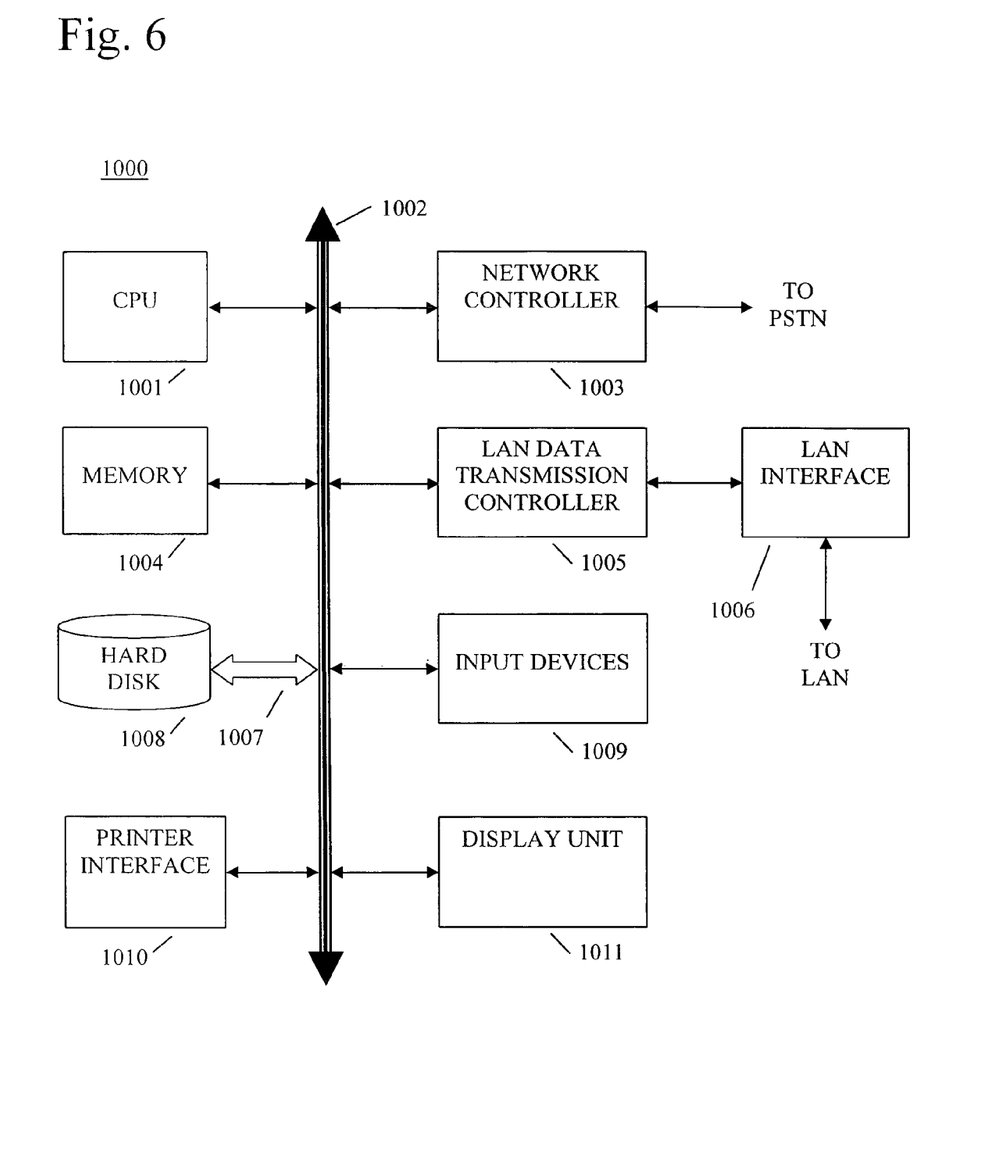
FIG. 6 shows an example of a computer system capable of implementing the method and apparatus according to embodiments of the present disclosure.

FIG. 6 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 1000 may include, for example, a central processing unit (CPU) 1001, random access memory (RAM) 1004, a printer interface 1010, a display unit 1011, a local area network (LAN) data transmission controller 1005, a LAN interface 1006, a network controller 1003, an internal bus 1002, and one or more input devices 1009, for example, a keyboard, mouse etc. As shown, the system 1000 may be connected to a data storage device, for example, a hard disk, 1008 via a link 1007.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A method for reorganizing a first database, comprising:
   using one or more computer systems to determine, based on one or more control statements, that a new index structure of a first database is required, the one or more control statements comprising one or more DBMS control statements that identify that the first database has been modified and that an index structure of the first database requires reorganization to reflect the modification to the first database;
   in response to determining that the new index structure of the first database is required, using the one or more computer systems to create a second database;
   using the one or more computer systems to copy data from the first database to the second database, the second database having an index structure that is different from the index structure of the first database such that the index structure of the second database is updated to include the modification to the first database;
   using the one or more computer systems to update the second database to reflect a modification made to the first database since the commencement of the copying; and
   switching the second database for the first database.

2. The method of claim 1, wherein prior to copying the data from the first database to the second database, a most recent transaction made to the first database is identified and when updating the second database to reflect changes that have been made to the first database since the commencement of the copying, those transactions that were made to the first database since the identified most recent transaction are applied to the second database.

3. The method of claim 1, additionally comprising:
   locking the first database from further transactions, and
   applying any transactions that have been applied to the first database but not the second database to the second database, after updating the second database to reflect changes that have been made to the first database since the commencement of the copying and before switching the second database for the first database, and
   unlocking the first database after switching the second database for the first database.

4. The method of claim 1, wherein the index structure of the second database is a reorganization of the index structure of the first database.

5. The method of claim 1, wherein copying the data comprises using a get command referring to an index structure of the first database to read data from the first database and using a put command referring to the index structure of the second database to write data to the second database.

6. The method of claim 1, wherein switching the second database for the first database comprises updating a control block of an application that accesses the first database to point to the second data base rather than the first database.

7. A method for reorganizing a first database, comprising:
   maintaining a first database having a first index structure;
   using one or more computer systems to determine, based on one or more control statements, that a new index structure of the first database is required, the one or more control statements comprising one or more DBMS control statements that identify that the first database has been modified and that an index structure of the first database requires reorganization to reflect the modification to the first database;
   in response to determining that the new index structure of the first database is required, using the one or more computer systems to prepare a second database having a second index structure, the second index structure different from the first index structure such that the index structure of the second database is updated to include the modification to the first database;
   identifying a most recent transaction from a first database log, the first database log recording a plurality of modifications made to the first database;
   using the one or more computer systems to copy data from the first database to the second database;
   using the one or more computer systems to update the second database with transactions performed to the first database since the identified most recent transaction; and
   switching the second database for the first database.

8. The method of claim 7, further comprising:
   locking the first database after updating the second database with transactions performed to the first database since the identified most recent transaction; and
   synchronizing the second database with the first database.

9. A method for reorganizing a first database, comprising:
   maintaining a first database having a first index structure;
   using one or more computer systems to determine, based on one or more control statements, that a new index structure of the first database is required, the one or more control statements comprising one or more DBMS control statements that identify that the first database has been modified and that an index structure of the first database requires reorganization to reflect the modification to the first database;
   in response to determining that the new index structure of the first database is required, using the one or more computer systems to create a second database having a second index structure, the second index structure different from the first index structure such that the index structure of the second database is updated to include the modification to the first database;
   using the one or more computer systems to identify a most recent transaction from a first database log, the first database log recording a plurality of modifications made to the first database;
   using the one or more computer systems to copy data from the first database to the second database;
   using the one or more computer systems to update the first database and the second database with transactions performed to the first database since the identified most recent transaction; and
   switching the second database for the first database.

10. A method for moving a first database from a first device to a second device, comprising:
    using one or more computer systems to determine, based on one or more control statements, that a new index structure of a first database is required, the one or more control statements comprising one or more DBMS control statements that identify that the first database has been modified and that an index structure of the first database requires reorganization to reflect the modification to the first database;

in response to determining that the new index structure of the first database is required, using the one or more computer systems to create a second database;

using the one or more computer systems to copy data from the first database on the first device to the second database on the second device;

using the one or more computer systems to update the second database to reflect a modification made to the first database; and switching the second database for the first database.

11. A system for reorganizing a first database, comprising:
a transaction log recording a plurality of modifications made to the first database; and
at least one computer system operable to reorganize the first database, the computer system comprising:
a preparing unit for:
determining, based on one or more control statements, that a new index structure of the first database is required, the one or more control statements comprising one or more DBMS control statements that identify that the first database has been modified and that an index structure of the first database requires reorganization to reflect the modification to the first database;
creating a second database in response to determining that the new index structure of the first database is required;
a copying unit for:
copying data from the first database to the second database having an index structure different from that of the first database;
an updating unit for updating the second database to reflect a modification made to the first database since the commencement of the copying; and
a switching unit for switching the second database for the first database.

12. The system of claim 11, wherein prior to copying the data from the first database to the second database, a most recent transaction made to the first database is identified and when updating the second database to reflect changes that have been made to the first database since the commencement of the copying, those transactions that were made to the first database since the identified most recent transaction are applied to the second database.

13. The system of claim 11, additionally comprising:
a locking unit for locking the first database from further transactions, and
an applying unit for applying any transactions that have been applied to the first database but not the second database to the second database, after updating the second database to reflect changes that have been made to the first database since the commencement of the copying and before switching the second database for the first database, and
an unlocking unit for unlocking the first database after switching the second database for the first database.

14. The system of claim 11, wherein the index structure of the second database is a reorganization of the index structure of the first database.

15. A system for reorganizing a first database, comprising:
a first database having a first index structure;
at least one computer system operable to reorganize the first database, the computer system comprising:
a preparing unit for:
determining, based on one or more control statements, that a new index structure of the first database is required, the one or more control statements comprising one or more DBMS control statements that identify that the first database has been modified and that an index structure of the first database requires reorganization to reflect the modification to the first database; and
in response to determining that the new index structure of the first database is required, creating a second database having a second index structure, the second index structure different from the first index structure such that the index structure of the second database is updated to include the modification to the first database;
an identifying unit for identifying a most recent transaction from a first database log, the first database log recording a plurality of modifications made to the first database;
a copying unit for:
copying data from the first database to the second database;
an updating unit for updating the second database with transactions performed to the first database since the identified most recent transaction; and
a switching unit for switching the second database for the first database.

16. The system of claim 15, further comprising:
a locking unit for locking the first database after updating the second database with transactions performed to the first database since the identified most recent transaction; and
a synchronizing unit for synchronizing the second database with the first database.

17. A system for reorganizing a first database, comprising:
a first database having a first index structure;
at least one computer system operable to reorganize the first database, the computer system comprising:
a preparing unit for:
determining, based on one or more control statements, that a new index structure of the first database is required, the one or more control statements comprising one or more DBMS control statements that identify that the first database has been modified and that an index structure of the first database requires reorganization to reflect the modification to the first database; and
in response to determining that the new index structure of the first database is required, creating a second database having a second index structure, the second index structure different from the first index structure such that the index structure of the second database is updated to include the modification to the first database;
an identifying unit for identifying a most recent transaction from a first database log, the first database log recording a plurality of modifications made to the first database;
a copying unit for:
copying data from the first database to the second database;
an updating unit for updating the first database and the second database with transactions performed to the first database since the identified most recent transaction; and
a switching unit for switching the second database for the first database.

18. A system for moving a first database from a first device to a second device, comprising:
a first database having a first index structure;
at least one computer system operable to reorganize the first database, the computer system comprising:
a preparing unit for:
determining, based on one or more control statements, that a new index structure of the first database is required, the one or more control statements comprising one or more DBMS control statements that identify that the first database has been modified and that an index structure of the first database requires reorganization to reflect the modification to the first database;
creating a second database in response to determining that the new index structure of the first database is required, the new index structure of the second database being different from a first index structure of the first database such that the index structure of the second database is updated to include the modification to the first database;
a copying unit for:
copying data from the first database on the first device to the second database on the second device;
an updating unit for:
updating the second database to reflect a modification made to the first database that was added since the commencement of the copying; and
a switching unit for switching the second database for the first database.

19. A computer system comprising:
a processor; and
a program storage device readable by the computer system, including computer executable code executable by the processor for reorganizing a first database, the computer executable code comprising:
code for determining, based on one or more control statements, that the first database has been modified and that a new index structure of the first database is required to reflect the modification to the first database;
code for creating a second database in response to determining that the new index structure of the first database is required;
code for copying data from the first database to the second database having an index structure different from that of the first database such that the index structure of the second database is updated to include the modification to the first database;
code for updating the second database to reflect a modification made to the first database that was added since the commencement of the copying; and
code for switching the second database for the first database.

20. The computer system of claim 19, wherein prior to copying the data from the first database to the second database, a most recent transaction made to the first database is identified and when updating the second database to reflect changes that have been made to the first database since the commencement of the copying, those transactions that were made to the first database since the identified most recent transaction are applied to the second database.

21. The computer system of claim 19, additionally comprising:
code for locking the first database from further transactions, and
code for applying any transactions that have been applied to the first database but not the second database to the second database, after updating the second database to reflect changes that have been made to the first database since the commencement of the copying and before switching the second database for the first database, and
code for unlocking the first database after switching the second database for the first database.

22. The computer system of claim 19, wherein the index structure of the second database is a reorganization of the index structure of the first database.

23. A computer system comprising:
a processor; and
a program storage device readable by the computer system, including computer executable code executable by the processor for reorganizing a first database, the computer executable code comprising:
code for maintaining a first database having a first index structure;
code for determining, based on one or more control statements, that a new index structure of the first database is required, the one or more control statements comprising one or more DBMS control statements that identify that the first database has been modified and that an index structure of the first database requires reorganization to reflect the modification to the first database;
code for creating a second database having a second index structure in response to determining that the new index structure of the first database is required, the second index structure different from the first index structure such that the index structure of the second database is updated to include the modification to the first database;
code for identifying a most recent transaction from a first database log, the first database log recording a plurality of modifications made to the first database;
code for copying data from the first database to the second database;
code for updating the second database with transactions performed to the first database since the identified most recent transaction; and
code for switching the second database for the first database.

24. The computer system of claim 23, further comprising:
code for locking the first database after updating the second database with transactions performed to the first database since the identified most recent transaction; and
code for synchronizing the second database with the first database.

25. A computer system comprising:
a processor; and
a program storage device readable by the computer system, including computer executable code executable by the processor for reorganizing a first database, the computer executable code comprising:
code for maintaining a first database having a first index structure;
code for determining, based on one or more control statements, that a new index structure of the first database is required, the one or more control statements comprising one or more DBMS control statements that identify that the first database has been modified and that an index structure of the first database requires reorganization to reflect the modification to the first database;
code for preparing a second database having a second index structure in response to determining that the new index structure of the first database is required, the second index structure different from the first index structure such that the index structure of the second database is updated to include the modification to the first database;

code for identifying a most recent transaction from a first database log, the first database log recording a plurality of modifications made to the first database;

code for copying data from the first database to the second database;

code for updating the first database and the second database with transactions performed to the first database since the identified most recent transaction; and code for switching the second database for the first database.

26. A computer system comprising:

a processor; and a program storage device readable by the computer system, including computer executable code executable by the processor for moving a first database from a first device to a second device, the computer executable code comprising:

code for determining, based on one or more control statements, that a new index structure of the first database is required, the one or more control statements comprising one or more DBMS control statements that identify that the first database has been modified and that an index structure of the first database requires reorganization to reflect the modification to the first database;

code for creating a second database in response to determining that the new index structure of the first database is required;

code for copying data from the first database on the first device to the second database on the second device;

code for updating second database to reflect a modification made to the first database that was added since the commencement of the copying; and code for switching the second database for the first database.

27. A method for reorganizing a first database, comprising:

using one or more computer systems to determine, based on one or more control statements, that a new index structure of a first database is required, the one or more control statements comprising one or more DBMS control statements that identify that the first database has been modified and that an index structure of the first database requires reorganization to reflect the modification to the first database;

in response to determining that the new index structure of the first database is required, using the one or more computer systems to create a second database;

using the one or more computer systems to copy data from the first database to the second database, the second database having an index structure that is different from the index structure of the first database such that the index structure of the second database is updated to include the modification to the first database;

using the one or more computer systems to update the second database to reflect a modification made to the first database since the commencement of the copying; and switching the second database for the first database, wherein copying the data comprises using a get command referring to an index structure of the first database to read data from the first database and using a put command referring to the index structure of the second database to write data to the second database, and wherein an address of the data within the index structure of the first database is different from an address of the data within the index structure of the second database.

28. A method for reorganizing a first database, comprising:

using one or more computer systems to identify that a new entry has been added to a first database having a first index structure;

determining that reorganization of the first database is required as a result of the new entry in the first database;

using the one or more computer systems to create a second database as a result of determining that the new index structure is required for the first database;

generating a second index structure for the second database, wherein the second index structure of the second database is a reorganization of the first index structure of the first database and includes the new entry to the first database;

using the one or more computer systems to copy data from the first database to the second database as a result of determining that the new index structure is required for the first database, wherein a copy command refers to the first index structure to read the data from the first database and to the second index structure to write the data to the second database;

switching the second database for the first database.

29. The method of claim 28, further comprising:

identifying that a new entry has been added to the second database;

determining that reorganization of the second index structure of the second database is required as a result of the new entry in the second database;

creating a third database as a result of determining that reorganization of the second index structure of the second database is required;

generating a third index structure for the third database, wherein the third index structure of the third database is a reorganization of the second index structure of the second database and includes the new entry to the second database copying data from the second database to the third database as a result of determining that reorganization of the second index structure of the second database is required, wherein a copy command refers to the second index structure to read the data from the second database and to the third index structure to write the data to the third database; and switching the third database for the second database.

* * * * *